Patented Dec. 22, 1953

2,663,709

UNITED STATES PATENT OFFICE 2,663,709

1-ALKYL-6,7-DIHYDROXY-1,2,3,4-TETRAHYDROISOQUINOLINE COMPOUNDS

Paul N. Craig, Pennsauken Township, Camden County, N. J., and Fred P. Nabenhauer, Philadelphia, Pa., assignors to Smith, Kline & French Laboratories, Philadelphia, Pa., a corporation of Pennsylvania No Drawing. Application August 15, 1950, Serial No. 179,646

6 Claims. (Cl. 260—286)

This invention relates to new chemical compounds, more particularly to hydroxy derivatives of isoquinoline and acid addition salts thereof.

The compounds of this invention will find utility in that they possess physiological activity, and more particularly possess bronchodilator properties, by which property they may be utilized as antiasthmatic agents.

The compounds according to this invention are particularly advantageous due to the fact that although they demonstrate marked bronchodilator activity, they, at the same time, demonstrate nominal cardiac and other undesirable side-effects. It is well-known that agents now known, and used as bronchodilators, uniformly possess certain potent and undesirable side-effects, outstandingly that of cardiac stimulation, which side-effects render their clinical use undesirable, if not impossible, in many clinical conditions. Thus, as a result of this invention, there is provided a class of bronchodilator agents of activity as great as, or greater than, presently known compounds, which find greater clinical usage in the treatment of asthmatic and various other conditions in which it is desirable to provide an increased vital capacity; and which are particularly useful because of their diminished cardiac side-effects to a point such as to practically eliminate that physiological response in routine clinical dosages.

Broadly speaking, the free base of the compounds according to this invention will have the following structure:

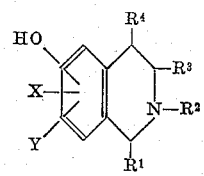

in which:

X and Y are members of the group consisting of hydrogen and hydroxy groups.

$R^1$ is a member of the group consisting of lower alkyl groups having not less than 2 carbon atoms.

$R^2$, $R^3$, and $R^4$ are selected from the group consisting of hydrogen and lower alkyl radicals.

Generally speaking, the compounds according to this invention will be prepared from the mono-, di- or tri-methoxy phenylalkylamine corresponding to the desired end product. Acylation of this amine with the acyl chloride or the acid anhydride corresponding to the radical desired in the 1-position of the isoquinoline product, prepares the methoxy-phenylethyl amide. This compound is then subjected to dehydration using suitable dehydrating agents such as $P_2O_5$, concentrated sulphuric acid, or phosphorous oxychloride to achieve ring closure with the formation of the 3,4-dihydroisoquinoline derivatives. The dihydro compound is then reduced using suitable reduction techniques as for example, hydrogen under pressure in the presence of hydrogenation catalysts such as platinum oxide, palladium on carbon, or Raney nickel, to give the 1,2,3,4-tetrahydroisoquinoline derivative.

This compound may then be converted to the corresponding hydroxytetrahydroisoquinoline by demethylation of the methoxy groups using 48% HBr. Either the methoxytetrahydroisoquinoline may be subjected to alkylation using an alkyl halide corresponding to the group which it is desired to place on the isoquinoline nitrogen atom or, alternately, the methoxydihydroisoquinoline may be similarly alkylated and then reduced to the corresponding methoxytetrahydro compound. The methoxy N-alkyltetrahydroisoquinoline may then be demethylated to form the corresponding hydroxy N-alkyltetrahydro compound of the invention.

The series of the reactions involved will become apparent from the following scheme in which the variables $R^1$, $R^2$, $R^3$, $R^4$, and X and Y will carry the same connotation as set forth in the broad general disclosure above, and in which n will be an integer of from 1 to 3,

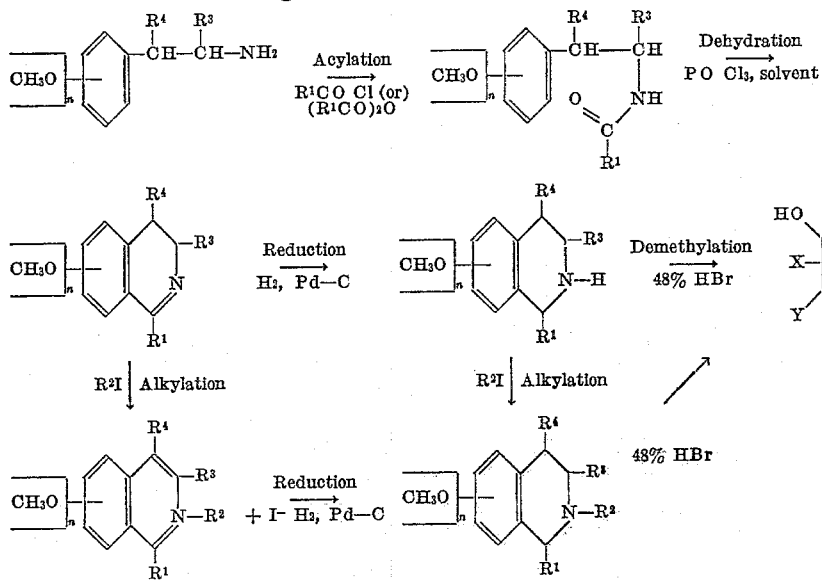

The following examples will be illustrative of the compounds according to this invention, and of their preparation:

*Example 1*

1-ethyl-6,7-dihydroxy - 1,2,3,4 - tetrahydroisoquinoline hydrobromide:

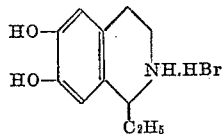

A mixture of 50 g. of 3,4-dimethoxyphenyl-β-phenethylamine and 52 g. of propionic anhydride was prepared with cooling. After five minutes, the solution was warmed on the steam bath for fifteen minutes and distilled. The amide solidified on standing and was recrystallized from benzene and petroleum ether; M. P. 57.5–59°.

A solution of 31 g. of the propionamide of 3,4-dimethoxy-β-phenethylamine in 200 ml. of benzene was refluxed on the hot plate for two and one-half hours with 35 ml. of phosphorus oxychloride. The mixture was added to ice, water and excess potassium hydroxide with stirring. The product was extracted with benzene, and the benzene layer was extracted with excess hydrochloric solution. The solution of amine hydrochloride was treated with excess potassium hydroxide solution and the liberated amine was taken up in benzene. Distillation gave 1-ethyl-6,7-dimethoxy-3,4-dihydroisoquinoline; B. P. 131–145°/0.3 mm.

Twenty-nine and six-tenths grams of the dihydroamine was dissolved in 50 ml. of alcohol and reduced with palladium-charcoal catalyst on the Parr-Burgess apparatus. The hydrogen take-up was 97% of the theoretical amount. The filtered solution was evaporated on the steam bath to a residual oil, dissolved in dry ether, and gaseous hydrogen chloride was introduced. The precipitated salt was recrystallized from ethanol and 99% isopropanol as the hydrochloride; M. P. 212–213.5° Recrystallization of the hydrochloride from alcohol and ether gave a melting point of 214–215°.

A solution of 24 g. of 1-ethyl-6,7-dimethoxy-1,2,3,4-tetrahydroisoquinoline hydrochloride in 100 g. of redistilled 48% hydrobromic acid and 1 ml. of 50% hypophosphorus acid was heated until the liquid temperature was 127° and the vapor temperature was 110°. The reaction required one and one-half hours. The hydrobromic acid was removed in vacuo and the solidified residue was recrystallized from ethanol and 99% isopropanol; M. P. 210–211°.

*Example 2*

1 - (n - propyl) -6,7-dihydroxy-1,2,3,4-tetrahydroisoquinoline hydrobromide

To a solution of 36.0 g. of 3,4-dimethoxy-phenethylamine in 200 ml. of benzene was slowly added 31.6 g. of butyric anhydride. The mixture was stirred and heated for 10 minutes on the steam bath. Distillation gave the colorless amide, B. P. 180–185°/0.5 mm. The amide was dissolved in 200 ml. of benzene and heated to reflux. A mixture of 30 g. of phosphorus oxychloride and 50 ml. of benzene was slowly added, and after one hour at reflux, most of the hydrogen chloride evolution ceased. The mixture was poured into 500 ml. of water and neutralized with an excess of 40% sodium hydroxide. The aqueous solution was washed with two 50 ml. portions of benzene, and the combined benzene layers were distilled. The resulting dihydroisoquinoline was obtained as a clear oil; B. P. 150–170°/2–3 mm.

The product was dissolved in 75 ml. of No. 30 alcohol and reduced with hydrogen in the presence of platinum oxide. The filtrate from the reduction mixture was evaporated; the residual oil was dissolved in ether and benzene. The addition of gaseous hydrogen chloride gave a precipitate, which was recrystallized from ethanol to give white crystals, M. P. 220–221°.

A mixture of 28 g. of 6,7-dimethoxy-1-n-propyl-1,2,3,4-tetrahydroisoquinoline hydrochloride, 50 ml. of redistilled 48% hydrobromic acid, and 1 ml. of 50% hypophosphorous acid was heated for one hour until the evolution of methyl bromide and hydrogen chloride ceased. The vapor temperature was 100° at the end of this time. The excess hydrobromic acid was removed by vacuum distillation, and acetone was added to the residues. The precipitate was washed with a large quantity of acetone. On filtration there were obtained white crystals; M. P. 221.5–223°.

*Example 3*

1 - isopropyl - 6,7 - dihydroxy-1,2,3,4-tetrahydroisoquinoline hydrobromide

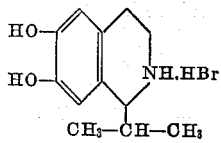

A solution of 18 g. of isobutyryl chloride (prepared from isobutyric acid with thionyl chloride) in 50 ml. of benzene was mixed with a solution of 63 g. of crude 3,4-dimethoxyphenethyl amine in 100 ml. of benzene. After the initial reaction subsided, the mixture was warmed on the steam bath for fifteen minutes. After cooling, the amine hydrochloride was removed by filtration. The benzene solution was washed with excess dilute hydrochloric acid and distilled; B. P. 204–6°/3 mm.

A solution of 36 g. of amide (prepared above) in 150 ml. of benzene was refluxed while a solution of 35 g. of phosphorous oxychloride in 80 ml. of benzene was added. After heating for one hour at reflux, the solution was cast onto a mixture of ice and excess 40% sodium hydroxide. The benzene layer was separated and two extracts of the aqueous layer were made using 60 ml. each of benzene. Distillation of the combined benzene layers gave the dihydroisoquinoline; B. P. 150–170°/2–3 mm.

This was dissolved in 100 ml. of No. 30 alcohol and reduced with hydrogen, using platinum oxide as a catalyst. Distillation of the filtrate from the reduction gave 26 g. of the tetrahydroisoquinoline; B. P. 152–4°/3 mm. The free base was dissolved in benzene and ether, and gaseous hydrogen chloride was introduced. The precipitated amine hydrochloride had a melting point after recrystallization from ethanol ether of 242–3°.

A mixture of 23.8 g. of 6,7-dimethoxy-1-isopropyl-1,2,3,4-tetrahydroisoquinoline hydrochloride, 80 ml. of redistilled 48% hydrobromic acid, and 0.5 ml. of 50% hypophosphorous acid was heated until the evolution of methyl bromide and hydrogen chloride ceased. At that time the bath temperature was 124° C. and the vapor temperature was 106° C. The excess hydrobromic acid was removed by vacuum distillation. The residue was washed with hot chloroform and benzene to give white crystals; M. P. 209–210.5°. One recrystallization from isopropanol and acetone raised the melting point to 214–215°.

*Example 4*

1 - (n-butyl) -6,7-dihydroxy-1,2,3,4-tetrahydroisoquinoline hydrobromide

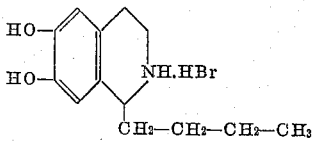

The acid chloride was prepared from 25.5 g. of n-valeric acid by the use of 40 grams of thionyl chloride. Distillation gave n-valeryl chloride; B. P. 120–129°. The acid chloride was added slowly with stirring, to a solution of 60 g. of β-3,4-dimethoxyphenethylamine in 200 ml. of benzene. Dilute hydrochloric acid was added to the mixture with stirring; the layers were separated. The benzene layer was washed twice with dilute hydrochloric acid, and then washed with dilute sodium hydroxide solution. The benzene was removed on the steam bath and the residue was distilled; B. P. 198–202°/1.3 mm.

Ring closure of 31.9 g. of the above amide was effected by refluxing for two hours with 40 g. of phosphorus oxychloride and 300 ml. of benzene. Water and benzene were added with stirring and the layers were separated. The aqueous layer was treated with excess potassium hydroxide, and extracted two times with 100 cc. each of benzene. The combined benzene layers were washed with water and then with dilute sodium hydroxide solution. The benzene layers were then extracted by three successive portions of dilute hydrochloric acid. The free base was liberated by the addition of excess 40% sodium hydroxide to the dilute hydrochloric acid solution, and the amine was extracted by two portions of benzene. On distillation the 1-(n-butyl)-6,7-dimethoxy-3,4-dihydroisoquinoline was isolated; B. P. 148–154°/0.8 mm.

A solution of the 26 g. of the dihydroamine prepared above in 100 ml. of No. 30 alcohol was reduced in the Burgess-Parr apparatus with platinum oxide as catalyst. The hydrogen take-up was 92% of the theoretical, and distillation yielded the tetrahydroisoquinoline; B. P. 156°/1 mm. This was dissolved in a mixture of benzene and ether. The hydrochloride was precipitated by the introduction of gaseous hydrogen chloride and separated by filtration. 1-n-butyl-6,7-dimethoxy-1,2,3,4-tetrahydroisoquinoline hydrochloride was recrystallized from alcohol and ether; M. P. 206–207° C.

A mixture of 22 g. of 1-n-butyl-6,7-dimethoxy-1,2,3,4-tetrahydroisoquinoline hydrochloride; 80 ml. of 48% hydrobromic acid (redistilled over hypophosphorous acid) and 1 g. hypophosphorous acid was heated four hours until the temperature of the liquid was 124° and the vapor temperature was 100°. The excess hydrobromic acid was removed in vacuo; acetone and benzene were added to the solid residue. After filtration, the solid was washed with acetone, and was recrystallized from acetone, alcohol and petroleum-ether; M. P. 196–197°.

*Example 5*

1-isobutyl - 6,7 - dihydroxy-1,2,3,4-tetrahydroisoquinoline hydrobromide

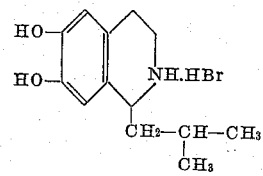

A solution of 72.5 g. of β-3,4-dimethoxyphenethylamine in 200 ml. of benzene was treated with 24.0 g. of isovaleryl chloride with stirring. The amide was treated exactly as in the preparation of the n-butyl amide of Example 4. Distillation gave the amide; B. P. 188–193°/0.75–1.0 mm.

To close the ring, 43.0 g. of the above amide was dissolved in 200 ml. of benzene and refluxed with 35 g. of phosphorous oxychloride for 2 hours. The dihydroisoquinoline was treated as in Example 4 for the preparation of 1-n-butyl-6,7-dimethoxy - 3,4 - dihydroisoquinoline hydrochloride. Distillation gave an oil; B. P. 134–140°/0.7 mm.

The reduction of 33.9 g. of 1-isobutyl-6,7-dimethoxy-3,4-dihydroisoquinoline was carried out using 100 ml. of No. 30 ethanol and platinum oxide catalyst. The hydrogen take-up was 88.5% of the theoretical. Distillation gave an oil; B. P. 148–149°/1.3 mm.

A mixture of 26.6 g. of 1-isobutyl-6,7-dimethoxy-1,2,3,4-tetrahydroisoquinoline and 120 ml. of hydrobromic acid (48%, redistilled over hypophosphorous acid) was heated with 1 g. of hypophosphorous acid. After 1 hour the bath temperature had reached 120°, and the evolution of methyl bromide ceased. The excess hydrobromic acid was removed in vacuo. The residual moist precipitate was washed with boiling acetone and filtered as white crystals; M. P. 220–222°.

*Example 6*

1-(sec-butyl) - 6,7 - dihydroxy-1,2,3,4-tetrahydroisoquinoline hydrobromide

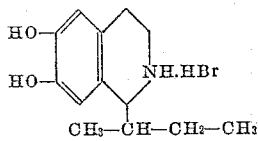

A solution of 27.0 g. of methylethylacetic acid in 40 g. of thionyl chloride was refluxed for ½ hour. The excess thionyl chloride was removed on the steam bath and a benzene solution of 100 g. of β-3,4-dimethoxyphenethylamine was added. The amide preparation was worked up as reported under the preparation of Example 4. Distillation gave an oil; B. P. 190°/1 mm.

For the ring closure, 38.5 g. of amide was dissolved in 150 ml. of benzene and refluxed with 30 cc. of phosphorous oxychloride for 2 hours. The dihydroamine was treated as in the preparation of 1-n-butyl-6,7-dimethoxy-1,2,3,4-tetrahydroisoquinoline hydrochloride in Example 4. Distillation isolated the dihydroamine; B. P. 138°/0.7 mm.

The tetrahydroisoquinoline was prepared by reduction of 20.0 g. of 1-sec-butyl-6,7-dimethoxy-3,4-dihydroisoquinoline in ethanol solution using platinum oxide catalyst. The hydrogen take-up was 94% of the theoretical. Distillation gave tetrahydroamine of B. P. 145–147°/0.8 mm.; which solidified on standing. The amine was dissolved in benzene and ether and the hydrochloride precipitated by passing in gaseous hydrogen chloride. On filtration the hydrochloride salt was obtained, and recrystallized from alcohol and ether.

The demethylation of 17.8 g. of 1-sec-butyl-6,7 - dimethoxy - 1,2,3,4 - tetrahydroisoquinoline hydrochloride was accomplished by heating with a mixture of 35 ml. of 48% hydrobromic acid (redistilled from hypophosphorous acid) and 0.5 g. of 50% hypophosphorous acid. After 1½ hours, the vapor temperature was 110°, and the liquid temperature was 126°. The hydrogen bromide was removed by evaporation in vacuo, and a gummy residue resulted. The residue was dissolved in hot acetone (120 ml.) and cooled. After three days, the white solid was filtered and washed with 100 ml. of hot acetone; filtration gave white crystals; M. P. 85–87°. It should be noted that this compound contains two different asymmetric carbon atoms, and can therefore exist in two racemic modifications. The abnormally low melting point of the final product indicates that both modifications are present in this mixture.

*Example 7*

1 - (t - butyl) - 6,7 - dihydroxy - 1, 2, 3, 4 - tetrahydroisoquinoline hydrobromide

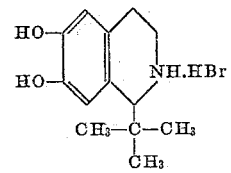

The acid chloride was prepared from 50 g. of trimethylacetic acid by refluxing with 100 ml. of thionyl chloride. Distillation gave 41 g. of trimethylacetyl chloride; B. P. 90–100°. The amide was prepared from 41.0 g. of trimethylacetyl chloride and 126 g. of β-3,4-dimethoxyphenethylamine using 800 ml. of benzene as solvent. The amide was obtained as described in the preparation of 1-n-butyl-6,7-dimethoxy-1,2,3,4-tetrahydroisoquinoline in Example 4. Distillation gave the amide; B. P. 168–178°/0.6 mm.

For the ring closure, 51.5 g. of the amide was dissolved in 300 ml. of benzene and refluxed for 9½ hours with 60 g. of phosphorous oxychloride. The longer time for reaction was used because it was feared that the ring closure might be sterically hindered by the presence of the tertiary butyl group. This did not seem to be the case, as the evolution of hydrogen chloride appeared to be similar to that found for the other ring closures. The dihydroamine was worked up as in the preparation of 1-n-butyl-6,7-dimethoxy-1,2,3,4-tetrahydroisoquinoline of Example 4. Distillation gave the dihydroamine; B. P. 132–138°/0.5 mm.

The reduction of 36.5 g. of 1-t-butyl-6,7-dimethoxy - 3,4 - dihydroisoquinoline was accomplished by the use of platinum oxide catalyst. The hydrogen uptake was 91% of the theoretical. Distillation gave the tetrahydroisoquinoline B. P. 140–142°/1 mm. The amine was dissolved in benzene and ether, and the hydrochloride formed by passing gaseous hydrogen chloride through the solution. The crystalline hydrochloride was recrystallized from water to give a first crop of white crystals; M. P. 272–273°. A second crop of white crystals was obtained on reduction in volume of the aqueous filtrate; this was mixed with the first crop and the mixture was recrystallized again from water to give white crystals; M. P. 270–272°.

A mixture of 25 g. of 1-t-butyl-6,7-dimethoxy-1,2,3,4-tetrahydroisoquinoline hydrochloride, 65 ml. of 48% hydrobromic acid (redistilled from hypophosphorous acid) and 1 g. of 50% hypophosphorous acid was heated until the liquid temperature was 126°. This required two hours. The excess hydrobromic acid was removed in vacuo, and the residue was dissolved in alcohol and acetone. The solution was evaporated to approximately 80 ml., and cooled. Filtration of the snow white crystals gave the desired product; M. P. 255–258°. A second crop with the same melting point was obtained by adding ether to the filtrate from the first crop. A third crop with the same melting point was obtained by evaporating the filtrate and adding acetone.

Example 8

1-cyclopentyl - 6,7 - dihydroxy - 1,2,3,4 - tetrahydroisoquinoline hydrobromide

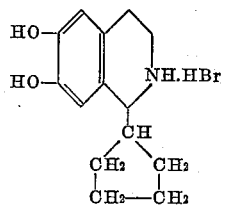

The acid chloride was prepared from 30 g. of cyclopentane-carboxylic acid by refluxing with 46 g. of thionyl chloride. On distillation 28 g. of acid chloride was obtained; B. P. 155–161°.

The amide was prepared from 28 g. of cyclopentanecarboxylic acid chloride, 82 g. of β-3,4-dimethoxyphenethylamine and 400 ml. of benzene in the manner reported for the amide preparation in Example 4 for 1-n-butyl-6,7-dimethoxy-1,2,3,4-tetrahydroisoquinoline hydrochloride. Distillation was not needed, as a while solid amide was left after the benzene was removed; M. P. 95–100°.

For the ring closure, 55.5 g. of the above amide was refluxed for two hours with 300 ml. of benzene and phosphorous oxychloride. The dihydroamine was treated as in Example 4. Distillation gave a yellowish viscous dihydroamine; B. P. 160–168°/0.6–0.7 mm.

The reduction of 39 g. of 1-cyclopentyl-6,7-dimethoxy-3,4-dihydroisoquinoline was accomplished by the use of platinum oxide and alcohol as the solvent. The hydrogen take-up was 80% of the theoretical. Distillation was attempted but the boiling point was so high that decomposition occurred near the boiling point. The crude product was dissolved in benzene and ether and the hydrochloride was prepared by bubbling in gaseous hydrogen chloride. Recrystallization of the solid salt from alcohol gave crystals M. P. 220–221°. A second crop was obtained by adding ether to the filtrate.

The demethylation of 21.1 g. of 1-cyclopentyl-6,7 - dimethoxy - 1,2,3,4 - tetrahydroisoquinoline hydrochloride was accomplished by heating with 60 cc. of 48% hydrobromic acid (redistilled from hypophosphorous acid) and 0.5 g. of 50% hypophosphorous acid. After 1½ hours, the vapor temperature was 110° and the liquid temperature was 126°. The excess hydrobromic acid was removed in vacuo, and the precipitate was washed out with acetone. Recrystallization of the precipitate from ethanol and ether gave crystals; M. P. 235–237°.

Example 9

1 - cyclopropyl-6,7 - dihydroxy - 1,2,3,4 - tetrahydroisoquinoline hydrobromide

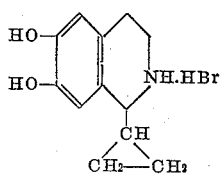

This compound will be prepared using a procedure identical with that described in the preparation of Example 1, except that an equimolar amount of cyclopropanecarboxylic acid chloride (prepared from cyclopropanecarboxylic acid and thionyl chloride) will be utilized to react with 3,4-dimethoxyphenyl-β-phenethylamine instead of propionic anhydride.

The cyclopropanecarboxamide prepared above will then be treated with phosphorous oxychloride, reduced and demethylated as described in Example 1 above, to form the 1-cyclopropyl-6,7-dihydroxy-1,2,3,4-tetrahydroisoquinoline hydrobromide.

Example 10

1 - cyclohexylmethyl - 6,7 - dihydroxy - 1,2,3,4-tetrahydroisoquinoline hydrobromide

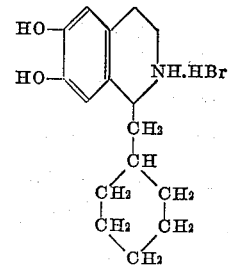

This compound will be prepared using a procedure identical with that described in Example 1, except that cyclohexylacetyl chloride will be utilized instead of propionic anhydride to react with the 3,4 - dimethoxyphenyl - β - phenethylamine. The cyclohexymethylamide so formed will then be converted to the dihydroxytetrahydroisoquinoline product following a procedure identical with that described in Example 1.

Example 11

1 - isopropyl - 2 - methyl - 6,7 - dihydroxy-1,2,3,4-tetrahydroisoquinoline hydrobromide

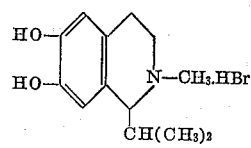

6,7 - dimethoxy - 1 - isopropyl - 1,2,3,4 - tetrahydroisoquinoline prepared in Example 3 is mixed with an excess of formalin solution and a molar quantity of formic acid. After warming the mixture on the steam bath for ½ hour, the mixture is neutralized with excess sodium hydroxide, and the amine is extracted with benzene. Distillation of the benzene solution gives the desired N-methyl derivative, which is subjected to demethylation using 48% hydrobromic acid as described in Example 3, to give the 6,7-dihydroxy-1 - isopropyl - 2 - methyl - 1,2,3,4 - tetrahydroisoquinoline hydrobromide.

Example 12

1 - isopropyl - 3 - methyl - 6,7 - dihydroxy-1,2,3,4-tetrahydroisoquinoline hydrobromide

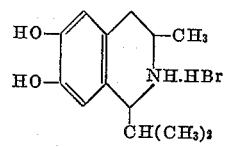

This compound will be prepared using a procedure identical with that described in the preparation of Example 1, except that 1-(3,4-dimethoxyphenyl)-2-aminopropane will be utilized as the starting amine in place of 3,4-dimethoxyphenyl-β-phenethylamine. This compound will then be reacted with isobutyric anhydride instead of propionic anhydride to prepare the amide, which will then be converted to the dihydroisoquinoline and reduced as described above to form the tetrahydroisoquinoline product. Demethylation with 48% hydrobromic acid will give the desired 1-isopropyl-3-methyl-6,7-dihydroxy-1,2,3,4-tetrahydroisoquinoline hydrobromide.

Example 13

1 - isopropyl - 4 - methyl - 6,7 - dihydroxy-1,2,3,4-tetrahydroisoquinoline hydrobromide

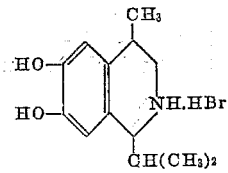

The preparation of this compound will be effected by treating 2-(3,4-dimethoxyphenyl)-propylamine with isobutyric anhydride to form the corresponding amide. Ring closure of the amide is then effected by phosphorous oxychloride using toluene as a solvent. The dihydroisoquinoline will then be reduced as described previously to form the tetrahydro compound. Demethylation with 48% hydrobromic acid will give the desired 1-isopropyl-4-methyl-6,7-dihydroxy-1,2,3,4-tetrahydroisoquinoline hydrobromide.

Example 14

1-isopropyl - 2 - ethyl - 6,7 - dihydroxy-1,2,3,4-tetrahydroisoquinoline hydrobromide

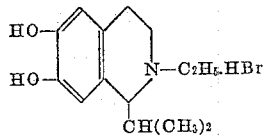

6,7-dimethoxy-1-isopropyl - 1,2,3,4-tetrahydroisoquinoline prepared as an intermediate in Example 3 is dissolved in methanol and refluxed with an equimolar quantity of ethyl iodide for 6 hours. Upon completion of the refluxing the mixture is distilled to isolate the N-ethyl compound which is then demethylated using a procedure identical with that described above with 48% hydrobromic acid to prepare the dihydroxy product.

Example 15

1-isopropyl-2 -(n-butyl) - 1,2,3,4-tetrahydroisoquinoline hydrobromide

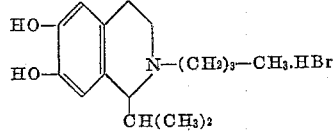

6,7-dimethoxy-1-isopropyl - 1,2,3,4-tetrahydroisoquinoline is refluxed with an equimolar quantity of n-butyl iodide using a procedure identical with that described in Example 14. The resulting amine is then converted, using identical techniques, to the dihydroxy tetrahydroisoquinoline product.

Example 16

1-ethyl-3-butyl - 6,7 - dihydroxy-1,2,3,4-tetrahydroisoquinoline hydrobromide

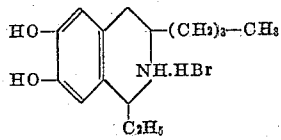

Veratrole is treated with caproyl chloride in a Friedel-Crafts reaction with aluminum chloride in carbon disulfide. After hydrolysis, distillation of the reaction mixture yields 3,4-dimethoxycaprophenone which is nitrosated using amyl nitrite and hydrochloric acid to give α-isonitroso-3,4-dimethoxycaprophenone.

The isonitroso derivative prepared above is reduced in glacial acetic acid using barium sulfate, perchloric acid and hydrogen according to the method of Rosenmund, Karg and Marcus [Berichte 75B, 1850 (1942)] to give the desired 1-(3,4-dimethoxyphenyl)-2-aminohexane.

The above formed amine is used as a starting material and is reacted with propionic anhydride to form the corresponding amide which may then be dehydrated using phosphorous oxychloride without isolation. The amide will then be converted to the final product using a procedure identical to that described above.

Example 17

1,3-diethyl-7-hydroxy - 1,2,3,4 - tetrahydroisoquinoline hydrobromide

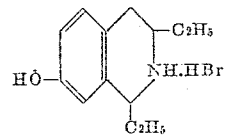

1-(p-methoxyphenyl)-2-aminobutane will be prepared according to the method of Rosenmund, Karg and Marcus [Berichte 75B, 1850 (1942)]. The 1-(p - methoxyphenyl)-2-aminobutane will then be reacted with propionic anhydride following a procedure identical with that used in Example 1. Ring closure of the resulting amide may be carried out using phosphorous oxychloride without need for a solvent. The resulting dihydroisoquinoline compound will be hydrogenated and demethylated to the desired 7-hydroxy tetrahydroisoquinoline.

Example 18

1-isopropyl-5,6,7 - trihydroxy - 1,2,3,4-tetrahydroisoquinoline hydrobromide

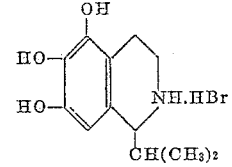

2,3,4 - trihydroxybenzaldehyde is methylated using dimethyl sulfate and potassium carbonate in acetone solution to prepare 2,3,4-trimethoxybenzaldehyde. Condensation with nitromethane in the presence of sodium hydroxide and ethanol yields 2,3,4-trimethoxy - ω - nitrostyrene. This compound is reduced with lithium aluminum hydride in ether solution to give β-(2,3,4-trimethoxyphenethyl)-amine.

This amine is combined with isobutyryl chloride to form the corresponding amide, which is then treated according to Example 1 to form the desired 1-isopropyl-5,6,7-trihydroxy - 1,2,3,4-tetrahydroisoquinoline hydrobromide.

Example 19

1-isopropyl-6,7-dihydroxy - 1,2,3,4-tetrahydroisoquinoline tartrate

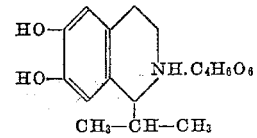

2.88 g. of 1-isopropyl-6,7-dihydroxy-1,2,3,4-tetrahydroisoquinoline hydrobromide (prepared in Example 3) was treated with a stoichiometric amount of sodium bicarbonate in 0.8 g. of water to prepare the free isoquinoline base. To this solution was added an equimolar quantity (1.45 g.) of dextro tartaric acid. Cooling and stirring caused the tartrate salt to crystallize. Recrystallization from water and ethanol gave long, needle-like crystals having a melting point (with decomposition) of 240-245° C.

While the above examples are specifically illustrated the hydrobromide and the tartrate of the compounds of this invention, the procedure for the preparation of other acid-addition salts of these compounds will, it is believed, be made obvious to anyone skilled in the art. It is not the intent of the applicant that this invention will be considered as being limited to only those salts specifically disclosed above, inasmuch as the spirit of invention resides in the bases themselves and the preparation of any particular acid-addition salt from the compounds of this invention is obvious to a skilled chemist. Further, it is readily apparent that the preparation of the free base from any particular salt will be accomplished by the addition to a given amount of that particular salt of equimolar amounts of alkali, as for example, sodium hydroxide, potassium hydroxide, sodium bicarbonate, potassium bicarbonate and others. Similarly the preparation of any given acid-addition salt from the free base so prepared is readily accomplished by treating with an equimolar amount of the appropriate acid.

What is claimed is:

1. A 1,2,3,4-tetrahydroisoquinoline of the class consisting of a free base and its acid addition salts, said free base having the formula:

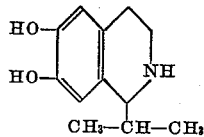

2. A 1,2,3,4-tetrahydroisoquinoline of the class consisting of a free base and its acid addition salts, said free base having the formula:

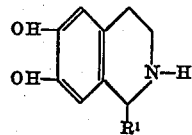

in which $R^1$ is a member of the group consisting of lower alkyl groups having not less than 2 carbon atoms.

3. The compound having the following formula:

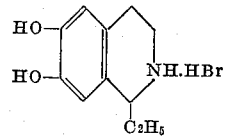

4. The compound having the following formula:

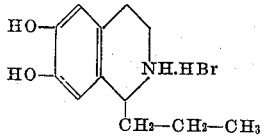

5. The compound having the following formula:

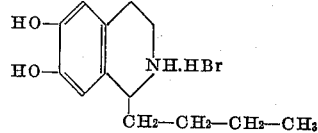

6. The compound having the following formula:

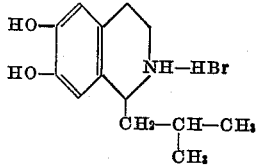

PAUL N. CRAIG.
FRED P. NABENHAUER.

References Cited in the file of this patent

FOREIGN PATENTS

| Number | Country | Date |
|---|---|---|
| 220,955 | Switzerland | Aug. 1, 1942 |
| 670,683 | Germany | Jan. 23, 1939 |
| 728,326 | Germany | Nov. 25, 1942 |

OTHER REFERENCES

Hjort et al., J. Pharmacol., vol. 76, pp. 64-74 (1942).

Chem. Abstracts, vol. 5, pp. 3811-3812 (1911).

Chem. Abstracts, vol. 35, page 7965 (1941).